(12) United States Patent
God et al.

(10) Patent No.: US 8,734,128 B2
(45) Date of Patent: May 27, 2014

(54) SILENCER DEVICE AND MOTOR VEHICLE COMPRISING SUCH A SILENCER DEVICE

(75) Inventors: David God, Södertälje (SE); Ragnar Glav, Vallentuna (SE); Lars Kjellström, Eskilstuna (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 14/110,741

(22) PCT Filed: Apr. 12, 2012

(86) PCT No.: PCT/SE2012/050396
§ 371 (c)(1),
(2), (4) Date: Oct. 9, 2013

(87) PCT Pub. No.: WO2012/148343
PCT Pub. Date: Nov. 1, 2012

(65) Prior Publication Data
US 2014/0030126 A1    Jan. 30, 2014

(30) Foreign Application Priority Data
Apr. 29, 2011  (SE) .................................. 1150376-0

(51) Int. Cl.
*F04B 39/00*  (2006.01)
*F04B 53/00*  (2006.01)

(52) U.S. Cl.
USPC ........................ 417/312; 181/276; 181/286

(58) Field of Classification Search
USPC ........................ 417/312; 181/212, 276, 286
See application file for complete search history.

(56) References Cited

U.S. PATENT DOCUMENTS

| 1,839,462 | A  | 1/1932  | Bourne |
| 6,199,658 | B1 | 3/2001  | Huff |
| 2010/0270103 | A1 | 10/2010 | Huff et al. |

FOREIGN PATENT DOCUMENTS

| DE | 200 18 689 U1 | 2/2001 | |
| DE | 103 52 442 A1 | 6/2005 | |
| SE | 518146 | 9/2002 | |
| WO | WO 97/17531 A1 | 5/1997 | |
| WO | WO9717531 A * | 5/1997 | ............... F01N 1/02 |
| WO | WO 2009/009119 A1 | 1/2009 | |

OTHER PUBLICATIONS

International Search Report dated Aug. 9, 2012 issued in corresponding International patent application No. PCT/SE2012/050396.
International Preliminary Report on Patentability dated Jun. 17, 2013 issued in corresponding International patent application No. PCT/SE2012/050396.

* cited by examiner

*Primary Examiner* — Charles Freay
*Assistant Examiner* — Philip Stimpert
(74) *Attorney, Agent, or Firm* — Ostrolenk Faber LLP

(57) ABSTRACT

A silencer device (10) for connection to a piston compressor of a motor vehicle: a housing (11) with an inlet (12) connected to a suction line or to an air outlet of a piston compressor, and an outlet (13) connected to an air inlet of a piston compressor or to a compressed air line. A throughflow air duct (20) extends through the housing. A quarter-wave resonator (30) in the housing has an elongate resonator duct (31) which is curved in its longitudinal direction, has at one end an inlet aperture (32) situated in a wall of the throughflow duct, and has a cross-sectional area larger than or equal to that of the throughflow duct. The other end (33) of the resonator duct is closed. A motor vehicle has such a silencer device.

9 Claims, 4 Drawing Sheets

SILENCER DEVICE AND MOTOR VEHICLE COMPRISING SUCH A SILENCER DEVICE

CROSS-REFERENCE TO RELATED APPLICATIONS

The present application is a 35 U.S.C. §§371 national phase conversion of PCT/SE2012/050396, which claims priority of Swedish Application No. 1150376-0, filed Apr. 29, 2011, the contents of which are incorporated by reference herein. The PCT International Application was published in the English language.

FIELD OF THE INVENTION AND PRIOR ART

The present invention relates to a silencer device for connection to a piston compressor of a motor vehicle, and a motor vehicle comprising such a silencer device.

In a motor vehicle provided with pneumatically operated brake cylinders, a piston compressor is often used to generate the compressed air required for operating the brake cylinders. Such a piston compressor is a strongly tonal sound source which generates a highly characteristic pulsating sound which may cause noise problems and even prevent noise certification of the vehicle. There is therefore a need to damp this pulsating sound.

OBJECT OF THE INVENTION

The object of the present invention is to propose a silencer device well suited to damping the pulsating sound which is generated when a piston compressor of a motor vehicle is in operation.

SUMMARY OF THE INVENTION

According to the present invention, said object is achieved by means of a silencer device disclosed herein.

The silencer device according to the invention comprises
  a housing with an inlet intended for connection to a suction line or to an air outlet of a piston compressor, and an outlet intended for connection to an air inlet of a piston compressor or to a compressed air line,
  a throughflow duct extending through the housing from said inlet to said outlet to allow intake air to the piston compressor to flow from the suction line to the piston compressor's air inlet via this throughflow duct, or compressed air to flow from the piston compressor's air outlet to the compressed air line via this throughflow duct, and
  a quarter-wave resonator situated in a housing and comprising an elongate resonator duct which is curved in its longitudinal direction and has at its one end an inlet aperture situated in a wall of the throughflow duct and with a cross-sectional area larger than or equal to that of the throughflow duct, the other end of the resonator duct being closed.

The silencer device according to the invention is thus configured to be situated between a piston compressor and the suction line which leads intake air to the piston compressor, or between a piston compressor and the compressed air line which leads compressed air from the piston compressor. The quarter-wave resonator will thus be positioned close to the piston compressor's air inlet or air outlet, i.e. near to the sound source, at a location relative to the piston compressor's air inlet or air outlet which can remain unchanged irrespective of vehicle model and of the configuration of the suction line and the compressed air line. Such positioning of the quarter-wave resonator is acoustically advantageous and results in the resonator's sound damping characteristic being less dependent on the specific configuration of the suction line and the compressed air line than in cases where the resonator is further away from the piston compressor's air inlet or air outlet.

An advantage of using a quarter-wave resonator is that such a resonator damps a fundamental sound and every second harmonic, unlike certain other types of resonators which are only capable of damping a fundamental sound. A further advantage of a quarter-wave resonator is that such a resonator is of relatively compact configuration. Providing the resonator with a curved resonator duct makes it possible for the silencer to be particularly compact and space-saving.

An embodiment of the invention is characterised
  in that the housing of the silencer device comprises a base element which has a cover element fitted to it,
  that the resonator duct takes the form of a channel situated in the base element and having a longitudinal aperture which faces towards the cover element, and
  that said longitudinal aperture of the channel is closed by the cover element.

Dividing the housing into such a base element and cover element makes the silencer device easier to manufacture. This construction of the housing also means that the resonator duct is readily accessible for desired adjustments and alterations before the cover element is fitted to the base element.

According to another embodiment of the invention, the silencer device comprises a cover element fittable to said base element and provided with a protrusion capable of being accommodated in said channel in the base element via the channel's longitudinal aperture in order to form an endwall which defines said closed other end of the resonator duct when the cover element is fitted to the base element. This makes it possible to vary the length of the resonator duct by varying the positioning of the protrusion on the cover element, and consequently to use base elements which share the same configuration to achieve silencer devices with mutually different sound damping characteristics by combining the base elements with different cover elements.

According to a further embodiment of the invention, a perforated plate is placed transversely across the resonator duct at the duct's inlet aperture. Providing such a perforated plate at the inlet aperture of the resonator duct affects the sound damping characteristic of the quarter-wave resonator in such a way that more frequencies will be damped, at the cost of somewhat inferior damping at the frequency for which the quarter-wave resonator is optimised. The perforated plate thus gives the quarter-wave resonator a broader sound damping characteristic and also serves as a barrier to ingress of litter or the like into the resonator duct.

According to a further embodiment of the invention, an absorbent made of sound-absorbing material is provided on one or more regions of the resonator duct's internal surface. Inserting such an absorbent in the resonator duct affects the sound damping characteristic of the quarter-wave resonator in that more frequencies will be damped, at the cost of somewhat inferior damping at the frequency for which the quarter-wave resonator is optimised. The absorbent thus gives the quarter-wave resonator a broader sound damping characteristic.

Other advantageous features of the silencer device according to the invention are indicated by the dependent claims and the description set out below.

The invention relates also to a motor vehicle having the features of the invention.

BRIEF DESCRIPTION OF THE DRAWINGS

The invention is described in more detail below on the basis of embodiment examples with reference to the attached drawings, in which.

DETAILED DESCRIPTION OF EMBODIMENTS OF THE INVENTION

Figure 1:
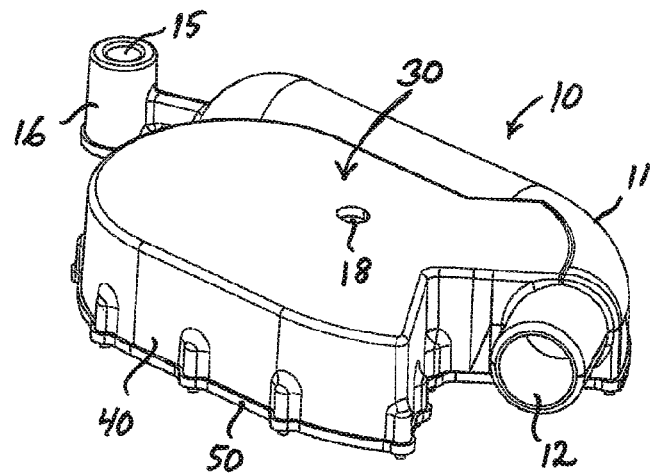
FIG. 1 is a perspective view from above of a silencer device according to an embodiment of the present invention.
Figure 2:
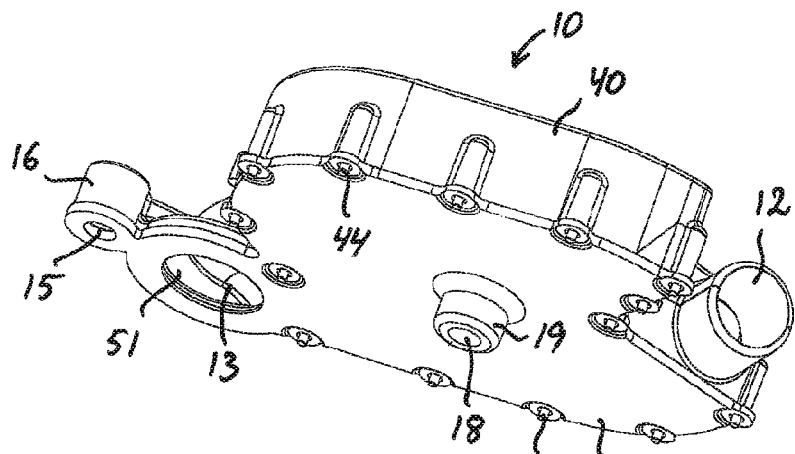
FIG. 2 is a perspective view from below of the silencer device according to FIG. 1.
Figure 3:
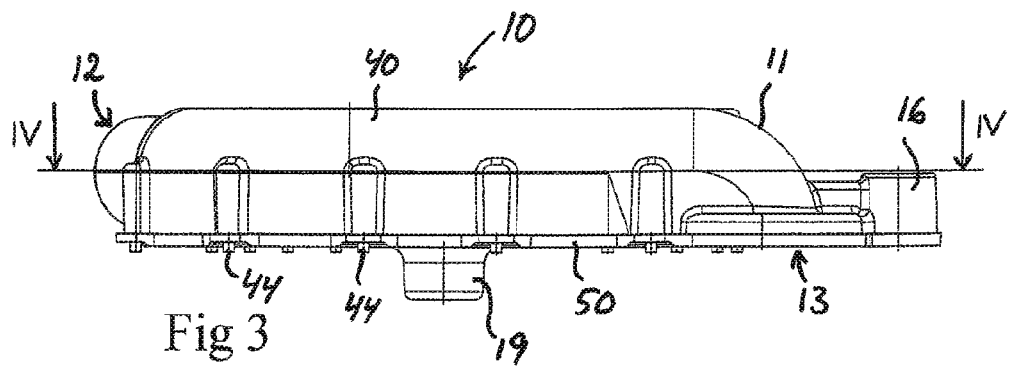
FIG. 3 is a side view of the silencer device according to FIG. 1.
Figure 4:
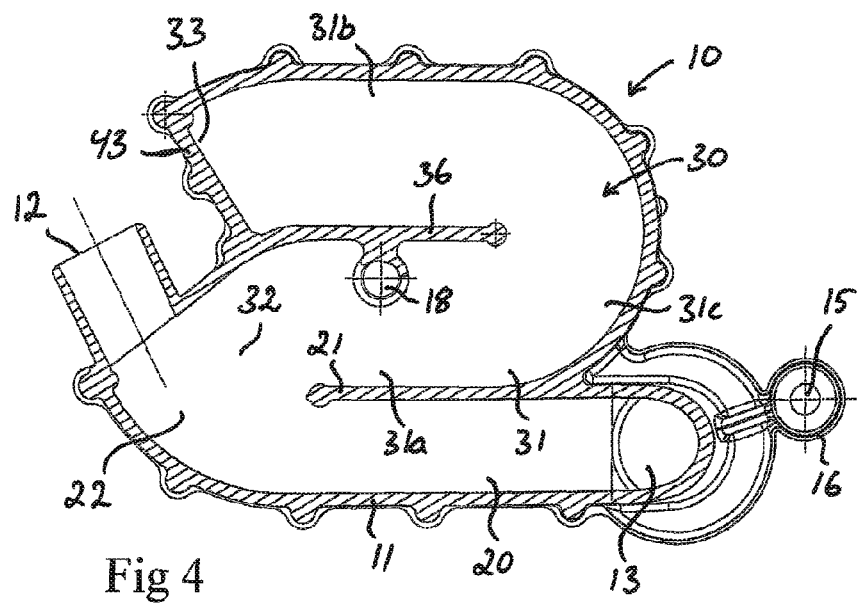
FIG. 4 is a longitudinal section along the line IV-IV in FIG. 3.

FIGS. 1-6 illustrate a silencer device 10 according to an embodiment of the present invention. This silencer device 10 is intended to be connected to a piston compressor 1 (schematically illustrated by broken lines in FIG. 5) of a motor vehicle in order to damp the noise which occurs during gas exchanges in the piston compressor when the latter is in operation. Said piston compressor 1 may for example take the form of a so-called brake compressor and be intended to generate compressed air for one or more pneumatically operated brake cylinders which form part of a brake system of the motor vehicle.

The silencer device 10 comprises a housing 11 with an inlet 12 intended for connection to a suction line 2 (schematically illustrated by broken lines in FIG. 5) of the motor vehicle, and an outlet 13 intended for connection to an air inlet of the piston compressor 1. The suction line 2 has its downstream end 3 connected to the inlet 12 of the silencer device's housing and may for example have its upstream end connected to an air filter situated close to the air intake of a combustion engine of the motor vehicle.

Figure 5:
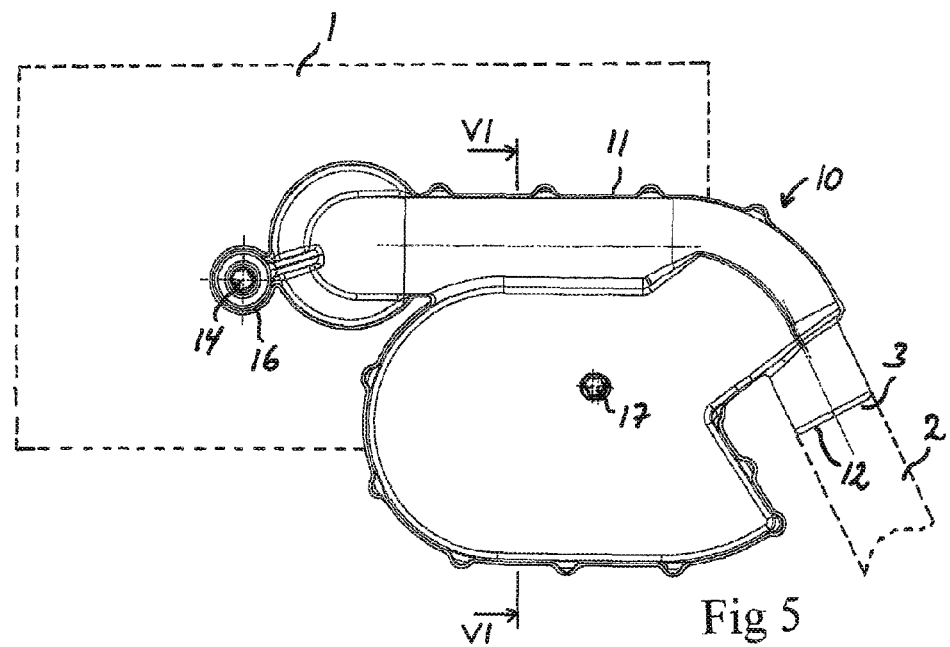
FIG. 5 is a plan view of the silencer device according to FIG. 1.
Figure 6:
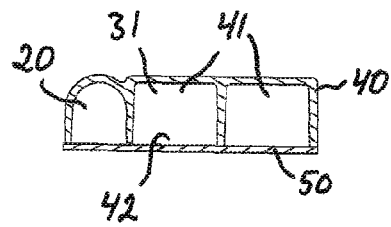
FIG. 6 is a cross-section along the line VI-VI in FIG. 5.

FIG. 5 depicts the silencer device 10 fitted to a schematically illustrated piston compressor 1. In the example depicted, the silencer device 10 is firmly screwed to the outer housing of the piston compressor 1 by means of a first threaded fastening means 14 which extends through a hole 15 running through a bracket 16 of the silencer device's housing 11 and engages in a threaded hole in the piston compressor's housing, and a second threaded fastening means 17 which extends through a hole 18 running through the silencer device's housing 11 and engages in a threaded hole in the piston compressor's housing. In the example depicted, a spacing means 19 is provided between the silencer device's housing 11 and the piston compressor's housing. The spacing means 19 protrudes from the silencer device's housing 11, and the hole 18 intended for said second fastening means 17 extends through this spacing means.

A throughflow duct 20 (see FIG. 4) is situated within the silencer device's housing 11. This throughflow duct 20 extends through the housing 11 from the latter's inlet 12 to its outlet 13 to allow intake air to the piston compressor to flow from the suction line 2 to the piston compressor's air inlet via this throughflow duct. The inlet 12 and outlet 13 of the housing thus also constitute the respective inlet and outlet of the throughflow duct 20.

A quarter-wave resonator 30 (see FIG. 4) is also situated within the silencer device's housing 11. This quarter-wave resonator 30 comprises an elongate resonator duct 31 which is curved in its longitudinal direction and which has at its one end an inlet aperture 32 situated in a wall 21 of the throughflow duct 20. The other end 33 of the resonator duct 31 is closed. The resonator duct's inlet aperture 32 in the example illustrated is situated at a bend 22 of the throughflow duct 20, on the inside of the bend.

The cross-sectional area of the resonator duct's inlet aperture 32 is larger than or equal to, but with advantage not more than three times as large as, that of the throughflow duct 20.

The cross-sectional area of the resonator duct 31 is with advantage constant along the whole of the duct, similar to the cross-sectional area of the inlet aperture 32, but the resonator duct might alternatively become narrower from its inlet aperture 32 towards its closed end 33.

In the embodiments illustrated, the resonator duct 31 bends round and comprises two portions 31a, 31b (see FIG. 4) which extend parallel alongside one another and are connected to one another by a duct bend 31c. This duct bend 31c curves through 180 degrees. The duct portions 31a, 31b are separated from one another by a dividing wall 36 situated between them and extend along their respective sides of this dividing wall. The resonator duct 31 might alternatively curve in some other way.

The quarter-wave resonator 30 is tuned to the dominant natural frequency of the suction line 2, and the length of the resonator duct 31 is dimensioned accordingly on the basis of that frequency.

The housing 11 comprises with advantage a base element 40 with a covered element 50 fitted to it, as in FIGS. 1-3 and 6. In the embodiment depicted in FIGS. 1-6, the cover element 50 is platelike and has running through it an aperture 51 connected to the downstream end of the throughflow duct 20 and constituting the housing's aforesaid outlet 13. The resonator duct 31 takes the form of a channel 41 situated in the base element 40 and provided with a longitudinal aperture 42 facing towards the cover element 50. This longitudinal aperture 42 of the channel 41 is closed by the cover element 50. The channel 41 extends from the resonator duct's inlet aperture 32 to an endwall 43 which forms part of the base element 40 (see FIG. 4) and which in the embodiments illustrated in FIGS. 1-6 defines the closed other end 33 of the resonator duct 31. The aforesaid spacing means 19 is situated on, and protrudes from, the cover element 50.

In the embodiment illustrated in FIGS. 1-6, the base element 40 is provided with locating pins 44 which protrude from the base element on its side which faces towards the cover element 50.

Each locating pin 44 can be accommodated in a respective hole running through the cover element 50. Fitting the base element and the cover element together involves the base element's locating pins 44 being pushed into the respective holes in the cover element. The length of the locating pins is such that they protrude somewhat from the respective holes on the side of the cover element which faces away from the base element when the cover element has been placed in position on the base element. Pressure or impact force is then exerted upon the protruding ends of the locating pins 44 so that they become deformed and fill the respective holes, thereby locking the cover element firmly to the base element. The cover element 50 might alternatively be fastened to the base element by threaded connections or welding.

The housing 11 is with advantage a cast housing made of aluminium, in which case the base element 40 and the cover element 50 take the form of aluminium castings. However, the housing 11 might alternatively be made in some other way and of some other material.

Figure 7:
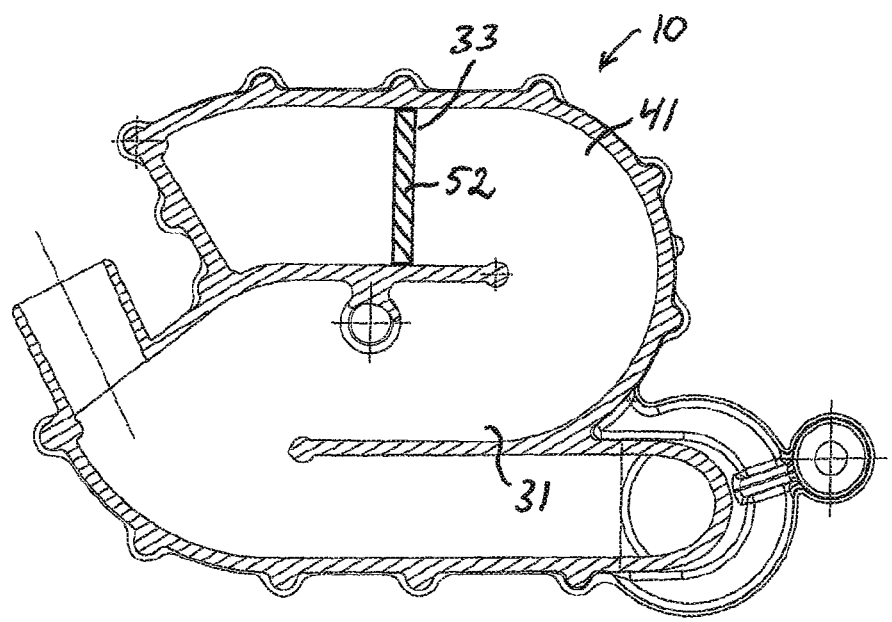
FIG. 7 is a longitudinal section through a silencer device according to a second embodiment of the present invention.

In the embodiment illustrated in FIG. 7, the closed other end 33 of the resonator duct 31 is defined by a protrusion 52 protruding from the cover element 50 on its side which faces towards the base element 40. The protrusion 52 can be accommodated in the channel 41 of the base element 40 via the channel's longitudinal aperture 42 in order to form an endwall which extends transversely to the longitudinal axis of the resonator duct 31 and which defines the latter's closed other end 33 when the cover element 50 is fitted to the base element 40. In this case the length of the resonator duct 31 and the consequent sound damping characteristic of the quarter-wave resonator are thus defined by the position of the protrusion 52. Having two mutually interchangeable cover elements 50 fitted to the same base element 40, one of them provided with a protrusion 52 of the type illustrated in FIG. 7 and described above, and the other having no such protrusion, makes it possible to vary the length of the resonator duct by choice of cover element. Such potential variation of the length of the resonator duct may of course also be achieved by having two or more mutually interchangeable cover elements 50 fittable to a given base element 40 and provided with a protrusion 52 of the type illustrated in FIG. 7 and described above which is positioned at different locations on the different cover elements.

Figure 8:
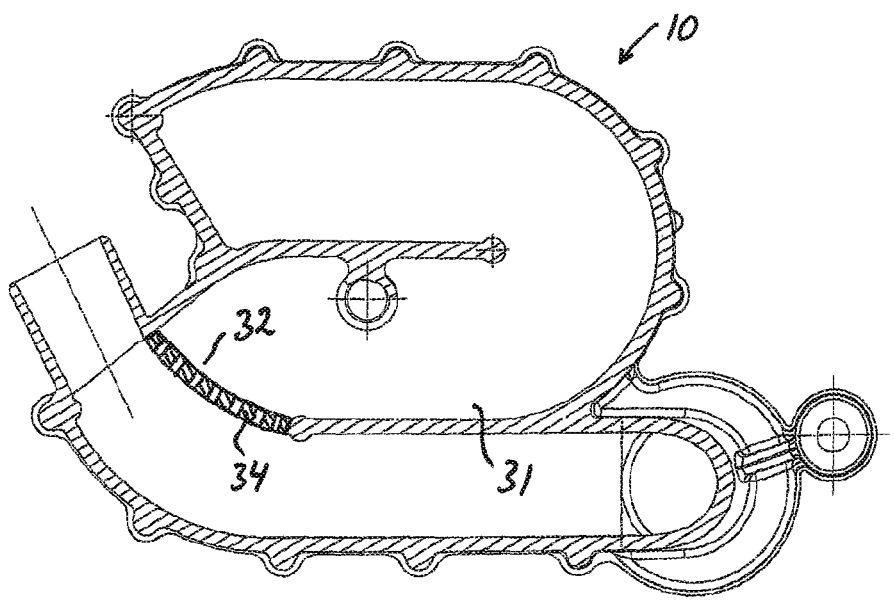
FIG. 8 is a longitudinal section through a silencer device according to a third embodiment of the present invention.

To influence the sound damping characteristic of the quarter-wave resonator, a perforated plate 34 may be placed transversely over the resonator duct 31 at the latter's inlet aperture 32, as illustrated in FIG. 8. This plate 34 may be integral with the base element 40 or take the form of a protrusion on the cover element 50.

Figure 9:
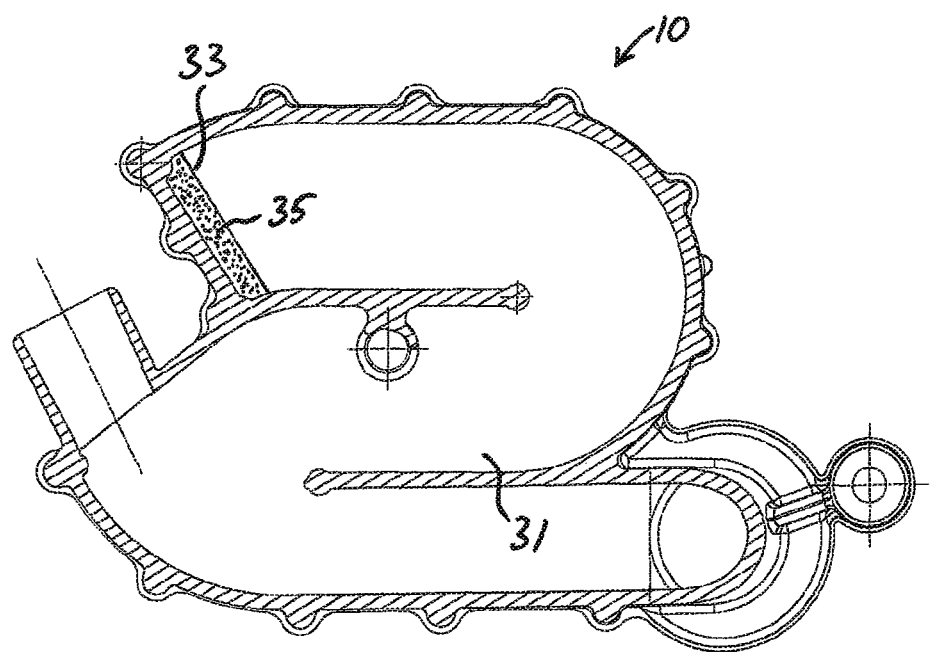
FIG. 9 is a longitudinal section through a silencer device according to a fourth embodiment of the present invention.

To influence the sound damping characteristic of the quarter-wave resonator, an absorbent 35 made of sound-absorbing material may also be placed on one or more regions of the resonator duct's internal surface, as illustrated in FIG. 9. In the example in FIG. 9, an absorbent 35 is placed at the resonator duct's closed other end 33. However, absorbents might alternatively be situated at other points along the resonator duct 31, e.g. at its inlet aperture 32. The respective absorbents 35 might for example be made of glass fibre wool, foam plastic, cotton fabric, cloth or some other suitable material with sound-absorbing characteristics.

The silencer device 10 according to the embodiments depicted in FIGS. 1-9 is intended for connection between a suction line and a piston compressor. However, the silencer device according to the present invention might alternatively be configured for connection between a piston compressor and a compressed air line, in which case the inlet 12 of the silencer device's housing 11 would be configured for connection to an air outlet of the piston compressor, and the outlet 13 of the silencer device's housing 11 for connection to a compressed air line, while the silencer device 10 might in other respects be configured as described above with reference to FIGS. 1-9. In this case the quarter-wave resonator 30 would be tuned to the dominant natural frequency of the compressed air line, and the length of the resonator duct 31 would be dimensioned accordingly on the basis of the compressed air line's dominant natural frequency.

The silencer device according to the invention is particularly intended to be used in a heavy motor vehicle, e.g. a bus, a tractor unit or a truck.

The invention is of course in no way restricted to the embodiments described above, since many possibilities for modifications thereof are likely to be obvious to one skilled in the art without therein deviating from the invention's basic concept as defined in the attached claims.

The invention claimed is:

1. A silencer device for connection to a piston compressor of a motor vehicle, the silencer device comprises:
   a housing with an inlet connectable to a suction line or to an air outlet of a piston compressor, and an outlet connectable to an air inlet of a piston compressor or to a compressed air line;
   a throughflow duct extending through the housing from the inlet to the outlet to allow air to flow from the inlet to the outlet via the throughflow duct, the throughflow duct having a first cross-sectional area;
   a quarter-wave resonator situated in the housing comprising an elongate resonator duct curved in longitudinal direction, having one end with an inlet aperture situated in a wall of the throughflow duct, the inlet aperture having a second cross-sectional area larger than or equal to the first cross-sectional area of the throughflow duct; another end of the resonator duct being closed;
   the housing comprises a base element and a cover element fitted to the base element;
   the resonator duct comprises a channel situated in the base element and having a longitudinal aperture facing towards the cover element;
   the cover element closing the longitudinal aperture of the channel; and
   the cover element being fittable to the base element and being provided with a protrusion for being accommodated in the channel in the base element via the longitudinal aperture in the channel to form an endwall which defines the closed other end of the resonator duct when the cover element is fitted to the base element.

2. A silencer device according to claim 1, wherein the resonator duct bends around to comprise two portions which extend parallel alongside one another and a duct bend connecting the two duct portions to one another.

3. A silencer device according to claim 1, wherein the throughflow duct has a bend, and the bend has an inside; the inlet aperture of the resonator duct is situated at the bend on the inside of the throughflow duct.

4. A silencer device according to claim 1, wherein the channel extends from the resonator duct inlet aperture to an endwall situated in the base element.

5. A silencer device according to claim 1, wherein the cross-sectional area of the resonator duct's inlet aperture is at most three times the cross-sectional area of the throughflow duct.

6. A silencer device according to claim 1, further comprising a perforated plate placed transversely over the inlet aperture of the resonator duct.

7. A silencer device according to claim 1, further comprising an absorbent of sound-absorbing material provided on at least one region of an internal surface of the resonator duct.

8. A motor vehicle comprising:
   a piston compressor having an air inlet, a suction line connected to the air inlet of the piston compressor and a compressed air line connected to the piston compressor and configured to allow compressed air to be led from the air outlet of the piston compressor via the compressed air line;

a silencer device according to claim 1, situated between the suction line and the piston compressor;

the inlet of the silencer device housing is connected to the suction line, and the outlet of the silencer device housing is connected to the air inlet of the piston compressor; and/or the silencer device is situated between the piston compressor and the compressed air line, the inlet of the silencer device housing is connected to the air outlet of the piston compressor and the outlet of the silencer device housing is connected to the compressed air line.

9. A motor vehicle according to claim 8, wherein the piston compressor is configured to generate compressed air for a brake system of the motor vehicle.

* * * * *